United States Patent
Lin et al.

(10) Patent No.: US 8,709,969 B2
(45) Date of Patent: Apr. 29, 2014

(54) NANOCATALYSTS STRUCTURE, PROCESS FOR THE PREPARATION AND USE THEREOF

(75) Inventors: Tsang-Lang Lin, Hsinchu (TW); Tsan-Yao Chen, Hsinchu (TW); Chiun-Yi Wu, Hsinchu (TW)

(73) Assignee: National Tsing Hua University, Hsinchu (TW)

( * ) Notice: Subject to any disclaimer, the term of this patent is extended or adjusted under 35 U.S.C. 154(b) by 249 days.

(21) Appl. No.: 13/173,761

(22) Filed: Jun. 30, 2011

(65) Prior Publication Data
US 2012/0088651 A1   Apr. 12, 2012

(30) Foreign Application Priority Data
Oct. 6, 2010   (TW) .............. 099134045 A

(51) Int. Cl.
| | |
|---|---|
| B01J 23/40 | (2006.01) |
| B01J 23/42 | (2006.01) |
| B01J 23/44 | (2006.01) |
| H01M 4/02 | (2006.01) |
| H01M 4/36 | (2006.01) |
| H01M 4/90 | (2006.01) |

(52) U.S. Cl.
USPC ............ 502/339; 502/326; 429/524; 429/526

(58) Field of Classification Search
USPC .......................... 502/326, 339; 429/524, 526
See application file for complete search history.

(56) References Cited

U.S. PATENT DOCUMENTS

| | | | | |
|---|---|---|---|---|
| 6,551,960 | B1 * | 4/2003 | Laine et al. ............. | 502/327 |
| 7,659,224 | B2 * | 2/2010 | Shimazaki et al. ....... | 502/180 |
| 7,687,428 | B1 * | 3/2010 | Zhong et al. ............ | 502/184 |
| 7,691,780 | B2 * | 4/2010 | Adzic et al. ............ | 502/339 |
| 8,168,561 | B2 * | 5/2012 | Virkar .................. | 502/326 |
| 8,304,365 | B2 * | 11/2012 | Shao et al. ............. | 502/313 |
| 8,389,175 | B2 * | 3/2013 | Shao et al. ............. | 429/482 |
| 8,475,921 | B2 * | 7/2013 | Kayama et al. .......... | 428/403 |
| 2006/0093892 | A1 * | 5/2006 | Min et al. .............. | 429/40 |
| 2007/0031722 | A1 * | 2/2007 | Adzic et al. ............ | 429/44 |
| 2008/0220296 | A1 * | 9/2008 | Eichhorn et al. ........ | 429/17 |
| 2010/0086832 | A1 * | 4/2010 | Lopez et al. ........... | 429/44 |
| 2010/0092841 | A1 * | 4/2010 | Lopez et al. ........... | 429/44 |
| 2010/0105548 | A1 * | 4/2010 | Zhang et al. ........... | 502/313 |
| 2011/0197490 | A1 * | 8/2011 | Ziegler ................ | 42/124 |
| 2011/0245068 | A1 * | 10/2011 | Stamenkovic et al. ..... | 502/101 |
| 2011/0256469 | A1 * | 10/2011 | Tong et al. ............ | 429/506 |
| 2011/0275009 | A1 * | 11/2011 | Goto et al. ............ | 429/506 |
| 2013/0177838 | A1 * | 7/2013 | Wang et al. ............ | 429/524 |

OTHER PUBLICATIONS

Notice of Allowance of TW counterpart application No. 099134045 issued on Aug. 5, 2013 and its English translation.

* cited by examiner

*Primary Examiner* — Cam N. Nguyen
(74) *Attorney, Agent, or Firm* — WPAT, P.C.; Anthony King; Kay Yang

(57) ABSTRACT

$Ru_{Core}$—$Pt_{shell}$ nanocatalysts with 1~3 atomic layers of Pt-shell were developed for enhancing the catalytic activities. Uniform atomic layers of Pt were successfully deposited on the core nanoparticles with high precision. Using such nanocatalysts as the cathode of the dye-sensitized solar cell (DSSC), the efficiency of DSSC can be significantly increased. For direct methanol fuel cell (DMFC) applications, much higher performance can also be achieved by using such $Ru_{Core}$—$Pt_{shell}$ nanocatalysts and the DMFC can be operated at room temperature without the need to raise the cell temperature to above room temperature (such as 80° C.).

4 Claims, 4 Drawing Sheets

NANOCATALYSTS STRUCTURE, PROCESS FOR THE PREPARATION AND USE THEREOF

CROSS-REFERENCE TO RELATED APPLICATIONS

This Non-provisional application claims priority under 35 U.S.C. §119(a) on Patent Application No(s). 099134045 filed in Taiwan, Republic of China, Oct. 6, 2010, the entire contents of which are hereby incorporated by reference.

FIELD OF THE INVENTION

The present invention relates to a nanocatalysts structure, and more particularly, to novel RuCore-Ptshell nanocatalysts structure, process for the preparation and use thereof for improving the efficiency and performance of solar, fuel cells and other applications.

BACKGROUND OF THE INVENTION

Catalyst is a chemical substance for improving chemical reaction occurrences or the reaction rate due to that the reduction of the energy (activation energy) for chemical reactions without changing itself. For nano-materials speaking, each size of which is roughly between 1 to 100 nm. They provide special properties that general materials do not, such as light absorption, catalytic and other characteristics, for many prospect applications due to the small-sized, large specific surface area, catalytic and quantum-sized effect. In recent years, metallic nano-particles become one of the most popular research topics since they are critical elements in catalyst applications due to the large specific surface area and novel catalytic property. A further step for the practical application is that the bi-metallic nano-particles can improve their catalytic performances by varying their compositions and atomic configurations.

Platinum is used as a cathode catalyst in membrane fuel cells for improving the oxygen or air reduction reactions, and the platinum alloy is used as an anode catalyst in membrane fuel cells for improving the fuel (hydrogen and methanol aqueous solutions) oxidation reactions. The purpose of using platinum alloy as the anodic catalyst is to avoid them from the poisoning of intermediates of carbon monoxide or other methanol oxidation species at low temperature (lower than 100° C.) environment. This is one of the key technologies of membrane fuel cells. Bi-metallic alloy, such as platinum-ruthenium (Pt—Ru) alloy, is the most widely used as the anode catalyst, and other multi-metal alloys, such as Pt—Ru—Rh and Pt—Ru—Rh—Ir is currently researched and developed and expected with better catalyst efficiency and anti-poisoning ability than the bi-metallic Pt—Ru alloy. In catalyst production, besides the well situated grain size and dispersion, the platinum alloy catalyst must have appropriate composition, such as Pt—Ru with Pt:Ru around 1:1 ratio of the number of atoms, for improving their catalytic properties.

In general, due to the benefit of low cost, light weight, and as the carrier and conducting materials for electrodes or membrane electrode assembly (MEA) production, the carbon black powder (such as Vulcan XC72 produced by Cabot Corporation, United States) is widely used as the main carrier for the production of platinum alloy catalyst. However, using Platinum based electrochemical catalysts in general membrane fuel cells or solar cells are not yet perfected due to the low energy conversion efficiency and high fabrication cost. Therefore, it is an important and meaningful issue that to improve the performance of catalysts used in proton membrane fuel cells, solar cells and other applications without the need to increase the loaded amounts of noble metal and most importantly to improve the overall performance of the device.

SUMMARY OF THE INVENTION

The above-mentioned problems are addressed by the present invention. The method of the present invention will be understood according to the disclosure of the following specification and drawings.

An embodiment of the present invention is to provide a catalyst with core-shell structure which comprises a ruthenium metal core and a platinum metal shell deposited on the ruthenium metal core nanoparticle; wherein the thickness of the platinum metal shell is 1 to 3 atomic layers.

Another embodiment of the present invention is to provide a method for preparing a catalyst with core-shell structure which comprises following steps: (a) forming a first substance by adding ruthenium trichloride into glycol, and forming a second substance by adding polyvinylpyrrolidone into glycol; (b) forming a third substance by mixing the first substance and the second substance; (c) heating the third substance to a first degree and then passing nitrogen for flowing in the third substance; (d) forming a fourth substance by mixing the third substance, the second substance, chloroplatinic acid solution and glycol; and (e) forming the catalyst with core-shell structure by heating the fourth substance to a second degree and then passing nitrogen for flowing.

In the step (a) aforementioned, further comprises the step of forming the first substance by vibrating ruthenium trichloride and glycol with a first period through an ultrasonic vibrator at room temperature, wherein the first period is 60 minutes.

In the step (a) aforementioned, further comprises the step of forming the second substance by stifling polyvinylpyrrolidone and glycol with a second period and a first rate at room temperature, wherein the second period is 30 minutes and the first rate is 500 rpm.

In the step (b) aforementioned, further comprises the step of stirring the first substance and the second substance with a third period and a second rate at room temperature, wherein the third period is 30 minutes and the second rate is 500 rpm.

In the step (c) aforementioned, further comprises the step of stirring the third substance with a third rate at the first degree, wherein the third rate is 120 rpm and the first degree is 140° C. to 180° C.

In the step (c) aforementioned, further comprises the step of passing nitrogen in the third substance for flowing a fourth period in the third substance, wherein the fourth period is 120 minutes.

In the step (c) aforementioned, further comprises the step of adding the third substance into acetone and removing acetone after the third substance condensed.

In the step (c) aforementioned, the volume of acetone is 10 times larger then the third substance's.

In the step (c) aforementioned, further comprises the step of adding the third substance into ethanol and waiting the third substance re-dispersed.

BRIEF DESCRIPTION OF THE DRAWINGS

The invention will be described according to the appended drawings in which.

DETAILED DESCRIPTION OF THE INVENTION

Figure 1:
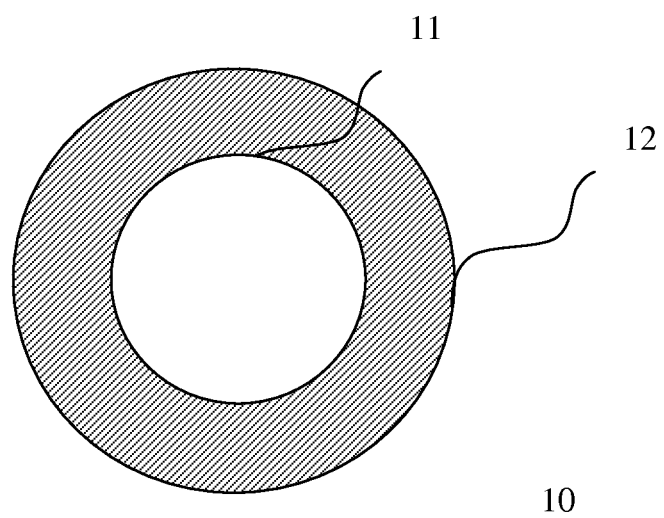
FIG. 1 shows a structural diagram of the catalyst with core-shell structure of the present invention.

A typical application of bimetallic nanoparticles is the extraction of carboxyl intermediate free hydrogen as energy feed in fuel cell system. One of the important steps is to remove the carbon monoxide by the preferential oxidation reaction (PROX) in order to prevent the gas products from contaminating and disabling the functions of the expensive platinum based catalyst in the fuel cell systems. In conventional case, it has to heat to 70° C. for removing carbon monoxide (PROX) by alloy catalyst with platinum and ruthenium. However, the activation reaction can be performed at room temperature with the core-shell nanoparticles aforementioned with the same elements being produced. Even more important is that this catalyst can also drive the methanol oxidation reaction without applying external potential at room temperature as disclosed in below. This leads to a large leap for the development of fuel cell systems as the power sources of portable electronics, the public transportations (e.g., electronic vehicle, etc.), etc.

The carbon monoxide oxidation reaction efficiency by using the platinum-ruthenium alloy catalyst is typically only 10% at 40° C., but the carbon monoxide oxidation reaction efficiency can be boosted by using the platinum-ruthenium core-shell catalyst that could much improve the efficiency to 80% at 40° C. There are two factors for improving the reaction efficiency. One is that the producing method of the core-shell nanostructure is capable of depositing element (platinum) on particular ruthenium with precise amounts. By comparing with the pure platinum catalysts, monoxide adsorbed on the surface of the specific nanostructure is significantly reduced and the surface of the specific nanostructure prepares more spaces for methanol reaction. The other one is a new reaction mechanism named of "hydrogen-assisted CO oxidation". The mechanism utilizes hydrogen atoms to hit oxygen molecules and produces the intermediate, peroxy X (hydroperoxy). Therefore, the oxygen atoms are more easily to generate. The oxygen atoms are selectively to react with carbon monoxide for producing carbon dioxide for providing more hydrogen than the pure platinum to solar cells or fuel cells. The present invention provides an ideal catalyst with ruthenium core and platinum shell and also provides a new preparing process for producing ruthenium-platinum nanostructure different to the traditional ruthenium-platinum material structure.

In addition, the Ru—Pt core-shell catalysts with 1-3 atomic shell layers could have high catalytic reaction activity even at a lower temperature by comparing with the ruthenium-platinum alloy catalysts. Therefore, the catalyst reaction of the Ru—Pt core-shell catalysts with 1-3 atomic shell layers can carry out at room temperature or relative low temperature for providing sufficient power output immediately without waiting the cell temperature to rise or to pre-heat the fuel cell. The fuel cells with ruthenium-platinum core-shell catalysts are relatively better in industry applications due to their higher efficiency and capability to operate at room temperature or lower temperatures.

FIG. 1 shows a structural diagram of the catalyst with core-shell structure of the present invention. The catalyst 10 with core-shell structure of the present invention comprises a ruthenium metal core 11 and a platinum metal shell 12. The platinum metal shell 12 is deposited on the ruthenium metal core 11. The thickness of the platinum metal shell is 1 to 3 atomic layers. "The thickness of the platinum metal shell is 1 to 3 atomic layers" is acquired through repeatedly experiments and test and verify.

Figure 2:
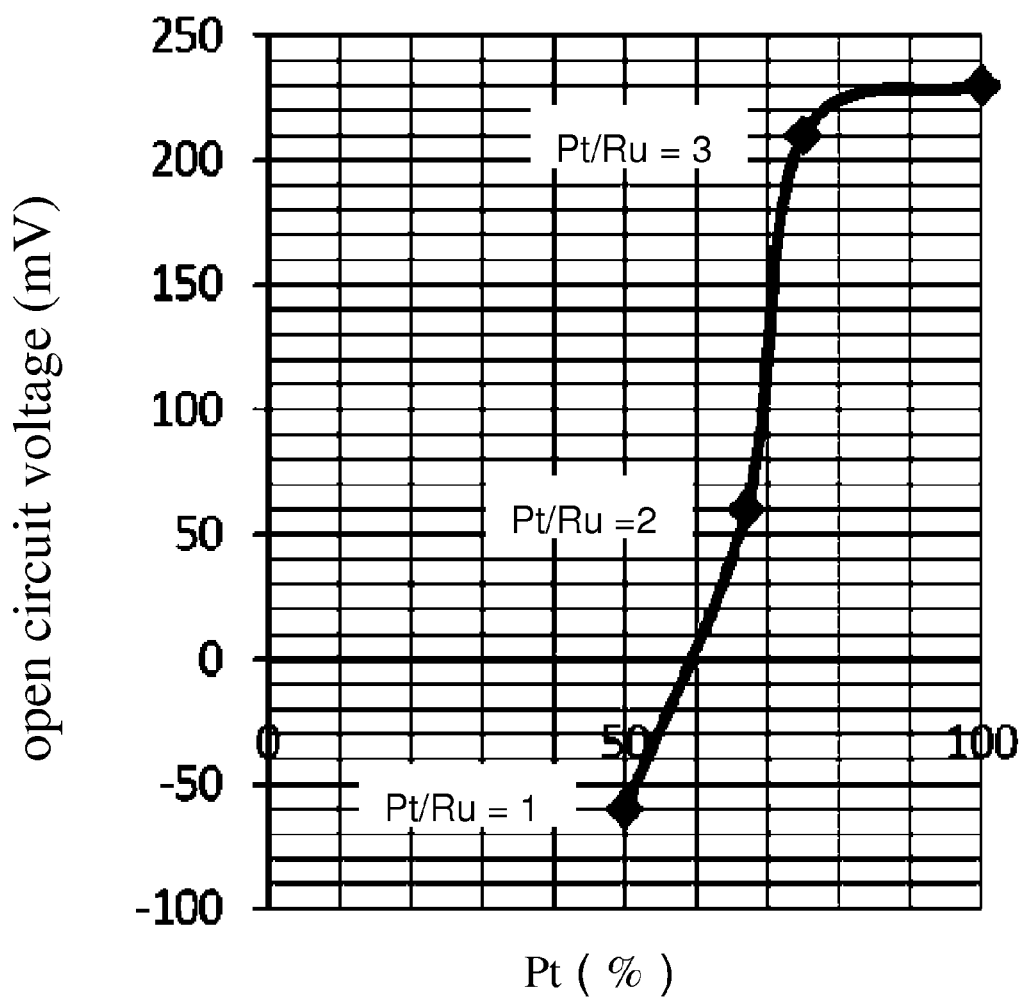
FIG. 2 shows a relationship curve between the open circuit voltage of direct-methanol fuel cells (DMFC) and platinum-ruthenium composition percentage ratio in the core-shell catalysts.

FIG. 2 shows a relationship curve diagram between open circuit voltage of direct-methanol fuel cells (DMFC) and platinum-ruthenium composition percentage in the catalyst. As the catalyst 10 (shown in FIG. 1) comprises a ruthenium metal core 11 and a platinum metal shell 12 with one platinum atomic layer thickness (platinum/ruthenium=1.0, the proportion of platinum and ruthenium are both 50% in the catalyst 10), the direct-methanol fuel cells (DMFC) can react spontaneously (since the Voc is negative), without the need to apply positive open circuit voltage (Voc) at room temperature. As the catalyst 10 (shown in FIG. 1) comprises a ruthenium metal core 11 and a platinum metal shell 12 with two platinum atomic layers thickness (platinum/ruthenium=2.0, the proportion of platinum is 66.67% in the catalyst 10), the direct-methanol fuel cells (DMFC) can start to react after providing a small open circuit voltage, about 60 mV, at room temperature. As the catalyst 10 (shown in FIG. 1) comprises a ruthenium metal core 11 and a platinum metal shell 12 with three platinum atomic layers thickness (platinum/ruthenium=3.0, the proportion of platinum is 75% in the catalyst 10), the direct-methanol fuel cells (DMFC) can start to react after providing an open circuit voltage about 210 mV at room temperature. As the catalyst 10 (shown in FIG. 1) comprises a pure platinum metal (the proportion of platinum is 100% in the catalyst 10), the direct-methanol fuel cells (DMFC) can start to react after providing an open circuit voltage about 230 mV at room temperature.

As shown in FIG. 2, as the proportion of platinum and ruthenium are both 50% in the catalyst, the open circuit voltage (Voc) is the lowest due to the structure characteristics and the fuel cells or solar cells can even directly react at room temperature. From low to high, the open circuit voltage (Voc) in turn is platinum/ruthenium=2.0, platinum/ruthenium=3.0 and traditional pure platinum metal nanoparticle. It proves that the catalyst with core-shell structure of the present invention with platinum/ruthenium=1.0 to 3.0 provides lower open circuit voltage (Voc) and higher catalytic properties than the catalyst with pure platinum metal nanoparticles. Also, the catalyst with core-shell structure of the present invention can be used more widely in the future, such as the application of electrodes in solar cells or other catalytic cells, etc.

Figure 3:
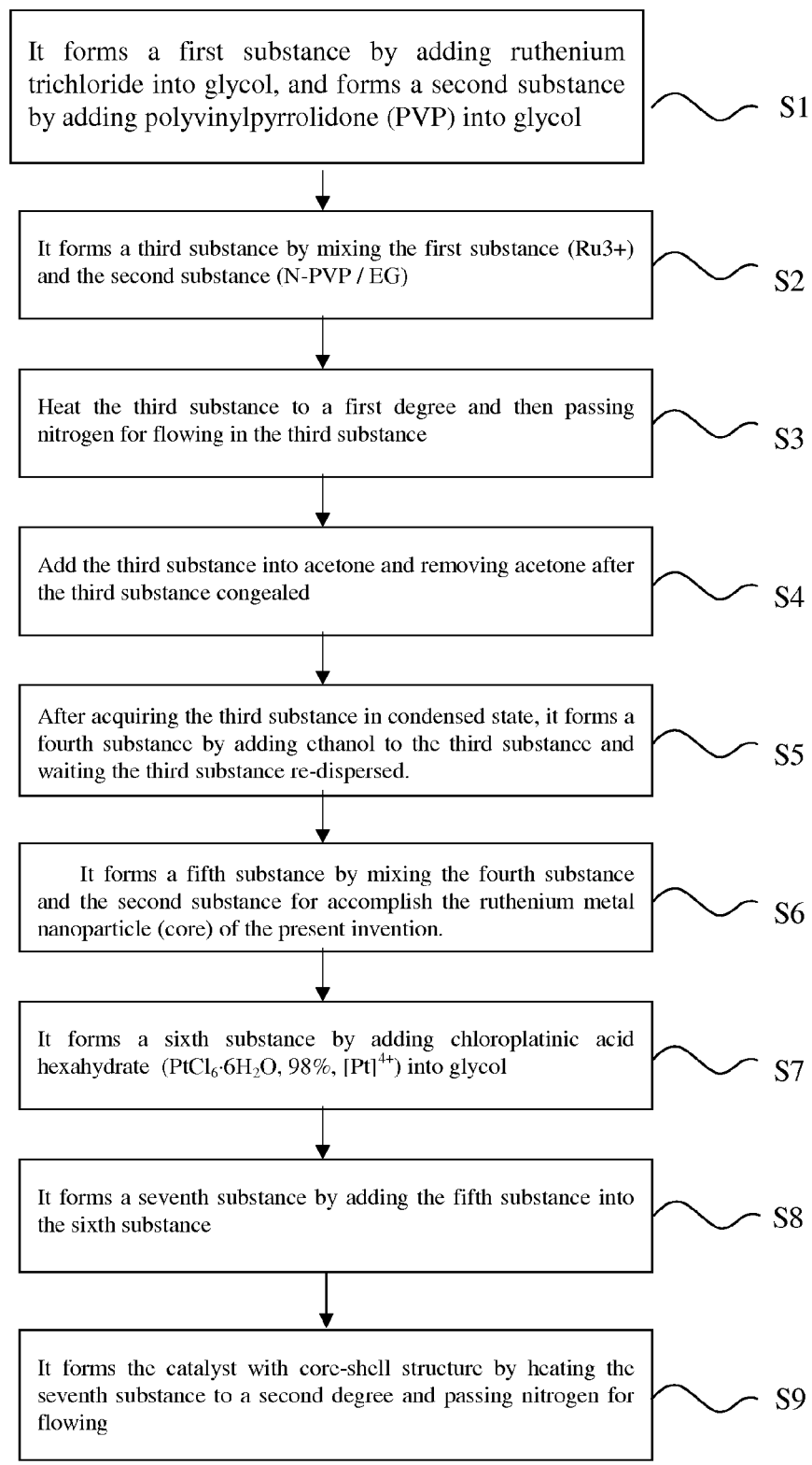
FIG. 3 shows a preparation flow chart of the catalyst with core-shell structure of the present invention.
Figure 4:
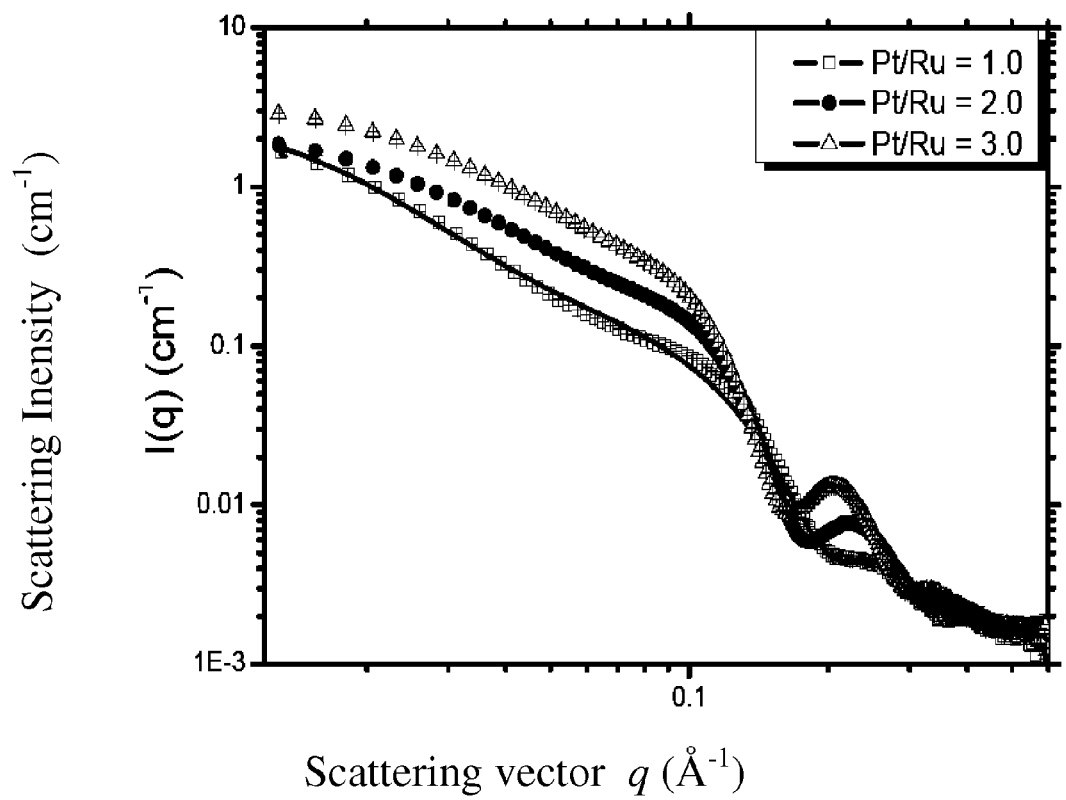
FIG. 4 shows the small-angle X-ray scattering curves of nanocatalysts with clear core-shell structure of the present invention.

FIG. 3 shows a preparation flow chart of the catalyst with core-shell structure of the present invention. Before producing the catalyst with core-shell structure of the present invention, precursors, such as chloro platinic acid solution ($PtCl_6.6H_2O$, 98%, [Pt]4+), ruthenium trichloride ($RuCl_3.xH_2O$, 99%, [Ru]3+), glycol ($C_2H_6O_4$, EG), Ethanol (EtOH), polyvinylpyrrolidone (PVP) and acetone, should be prepared at first. The precursors can be purchased easily on market. The present invention includes many precise oxidation-reduction reactions due to the final objective of reducing the platinum atoms on the ruthenium nanoparticles directly.

In producing the catalyst with core-shell structure of the present invention, at first, it forms a first substance by adding ruthenium trichloride into glycol, and forms a second substance by adding polyvinylpyrrolidone (PVP) into glycol (step S1). The first substance is ruthenium ions (Ru3+) and the second substance is N-polyvinylpyrrolidone glycol solution (N-PVP/EG). After step S1, it forms a third substance by mixing the first substance (Ru3+) and the second substance (N-PVP/EG) (step S2), and heats the third substance to a first degree and then passing nitrogen for flowing in the third substance (step S3). The third substance is polyvinylpyrrolidone blended ruthenium nanoparticles in glycol solution (PVP-[Ru]/EG). After step S3, it adds the third substance into acetone and removing acetone after the third substance congealed (step S4), for acquiring the third substance in condensed state. The fourth substance is polyvinylpyrrolidone-ruthenium-core ethanol solution (PVP-Rucore/EtOH). After step S5, it forms a fifth substance by mixing the fourth substance and the second substance for accomplish the ruthenium metal nanoparticle (core) of the present invention (step S6). The fifth substance is a ruthenium metal nanoparticle covered with polyvinylpyrrolidone (PVP) polymer layer in EtOH. Steps S1 to S6 are used for producing ruthenium metal nanoparticle (core). The following steps are used for producing (depositing) the platinum atoms on the ruthenium metal core. For producing (depositing) the platinum atoms on the ruthenium metal nanoparticle (core), at first, it forms a sixth substance by adding chloroplatinic acid hexahydrate ($PtCl_6 \cdot 6H_2O$, 98%, [Pt]4+) into glycol (step S7). The sixth substance is polyvinylpyrrolidone-platinum glycol solution (PVP-[Pt]4+/EG). After step S7, it forms a seventh substance by adding the fifth substance into the sixth substance (step S8). And then, it forms the catalyst with core-shell structure by heating the seventh substance to a second degree and passing nitrogen for flowing (step S9).

For increasing the reacting rate of the steps aforementioned, in the step S1, further comprises the step of forming the first substance by vibrating ruthenium trichloride and glycol with a first period through an ultrasonic vibrator at room temperature, wherein the first period is 60 minutes. In the step S1, further comprises the step of forming the second substance by stifling polyvinylpyrrolidone and glycol with a second period and a first rate at room temperature, wherein the second period is 30 minutes and the first rate is 500 rpm. In the step S2, further comprises the step of stifling the first substance and the second substance with a third period and a second rate at room temperature, wherein the third period is 30 minutes and the second rate is 500 rpm. In the step S2, further comprises the step of stifling the third substance with a third rate at the first degree, wherein the third rate is 120 rpm and the first degree is 140° C. to 180° C. In the step S2, further comprises the step of passing nitrogen in the third substance for flowing a fourth period in the third substance, wherein the fourth period is 120 minutes. In the step S4, the volume of acetone is 10 times larger then the third substance's. In the step S5, further comprises the step of stirring the fourth substance and the second substance with a fifth period and a fourth rate at room temperature, wherein the fifth period is 30 minutes and the fourth rate is 500 rpm. In the step S7, further comprises the step of stifling chloroplatinic acid hexahydrate ($PtCl_6 \cdot 6H_2O$, 98%, [Pt]4+) into glycol with a sixth period and a fifth rate at room temperature, wherein the sixth period is 30 minutes and the fifth rate is 500 rpm. In the step S8, further comprises the step of stirring the fifth substance and the sixth substance with a seventh period and a sixth rate at room temperature, wherein the seventh period is 20 to 30 minutes and the sixth rate is 500 rpm. In the step S9, the second degree is 140° C. to 180° C. In the step S9, further comprises the step of stirring the seventh substance with a eighth period and a seventh rate at room temperature, wherein the eighth period is 120 minutes and the seventh rate is 120 rpm.

For depositing the platinum metal shell on the ruthenium metal core with 1 to 3 atomic layer thicknesses, we can modulate the platinum metal shell thickness by different amount of chloroplatinic acid hexahydrate salt (189.0 mg to 567.0 mg). After all steps aforementioned are finished, there are dark-brown wax powders, generated in acetone and diffused in ethanol as mud, for treating as the anode catalyst.

The small angle X-Ray scattering (SAXS) device is used for analyzing the nanostructures of nanoparticles with complex structures formed by different materials. The SAXS analysis can provide precise measurement based on the difference of the scattering cross section for different materials. The SAXS measurement is a nondestructive method for investigating material nanostructures, particle sizes and shapes. The internal structures of the materials are obtained by analyzing the X-ray scattering characteristic of the materials. Therefore, the small angle X-ray scattering (SAXS) device is used here to prove that the information about the nanostructure of the catalyst with core-shell structure of the present invention that provides the improvement of energy conversion efficiency. The uniformly deposited atomic shell layers and the shell thickness can be clearly observed and proven by SAXS analysis. It is important to demonstrate that there is truly a shell layer of on the nanoparticle core and also to determine the shell thickness with high precision.

FIG. 5 shows the measured SAXS scattering curves of the Ru—Pt core-shell bimetallic nanoparticles. Accordingly, the catalyst with core-shell of the present invention is added into distilled water. In FIG. 5, q is X-ray's scattering vector (approximately direct proportional to scattering angle), I(q) is the X-ray's scattering intensity variation of the catalyst particle as a function of the scattering vector q. As the composition ratio of platinum-metal-shell to ruthenium-metal-core is increased (replacing "platinum/ruthenium=1.0" to "platinum/ruthenium=3.0"), the strong and noticeable interference peaks at around $q=0.2\sim0.25$ Å−1 are due to the clear core-shell structure and provide the evidence of the existence of a uniform shell. The peak position of the interference peak moves toward lower q position as the shell thickness is increased for higher Pt to Ru composition ratios. Table 1 is a list of the structural parameters of the Ru—Pt core-shell nanocatalyst particle as determined by the small angle X-Ray scattering (SAXS) measurements.

TABLE 1

| Pt/Ru | $R_C$ (Å) | $R_{NPs}$ (Å) | $T_S$ (Å) | ALs | P |
|---|---|---|---|---|---|
| Ru NPs | 15.7 | 15.7 | 0 | 0 | 0.1 |
| 1.0 | 15.9 | 20.1 | 4.2 | 1.5 | 0.08 |
| 2.0 | 15.7 | 23.2 | 7.5 | 2.7 | 0.07 |
| 3.0 | 15.7 | 25.6 | 9.9 | 3.6 | 0.08 |
| Pt NPs | — | 20.8 | — | — | 0.27 |

In Table 1, the radius of ruthenium metal core $R_C$ is around 15.7 to 15.9 Å. As the "platinum/ruthenium=1.0" is changed to "platinum/ruthenium=3.0", the radius of the whole catalyst increased from 20.1 to 25.6 Å. TS is the thickness of the platinum shell. The number of atomic-layer ALs of the platinum metal shell is evaluated by dividing the shell thickness by the thickness of one-layer platinum crystal, about 2.7 Å. P is the polydispersity of the radius distribution of the catalyst particles.

Table 2 is a comparison table of half-cell methanol oxidation current density using anodes coated with present catalysts. In Table 2, it is obvious that the current density (ΔIP) has 48.3% improvement for the catalyst with the platinum shell thickness of 1.5 atomic layers as compared with that of platinum nanoparticles. The current density (ΔIP) has 8.3% improvement only as the thickness of the platinum metal shell is 3.6 atomic layers. The 8.3% improvement over the catalyst with pure platinum metal (without ruthenium metal core) is small and it is already near the performance of pure platinum metal catalyst. It is proved here that the current density is greatly improved as the platinum metal shell is just 1 to 3 atomic layers with smaller the better. Moreover, it is highly sensitive to the number of atomic layers, with the lower the atomic layers are, the higher the current density is. Thus, it is highly important to be able to control the desired number of atomic layers deposited on each catalyst with the same precision and uniformity.

TABLE 2

| Pt (ALs) | $\eta$ (Å$^2$) * 1019 | $\Delta\eta$ (%) | $\Delta$IP (%) | IP area (mC) | IP |
|---|---|---|---|---|---|
| 1.5 | 8.1 | 55.7 | 48.3 | 9.4 | 28.1 |
| 2.7 | 6.6 | 26.9 | 24.7 | 7.9 | 22.5 |
| 3.6 | 5.7 | 9.6 | 8.3 | 6.9 | 20.5 |
| Pt NPs | 5.2 | Standard | Standard | 6.3 | 27.7 |

The above-described embodiments of the present invention are intended to be illustrative only. Numerous alternative embodiments may be devised by those skilled in the art without departing from the scope of the following claims.

What is claimed is:

1. A catalyst having a core-shell structure for reducing the open circuit voltage (Voc) of a fuel cell or a solar cell, wherein the radius of the catalyst is 20-26 Å, comprising:
 a ruthenium metal core; and
 a platinum metal shell uniformly deposited on the ruthenium metal core;
 wherein the thickness of the platinum metal shell is 1 to 3 atomic layers;
 wherein the polydispersity of the radius distribution of each atomic layer is 0.05-0.1.

2. The catalyst having a core-shell structure of claim 1, wherein the catalyst having a core-shell structure is used in the fuel cell or the solar cell.

3. The catalyst having a core-shell structure of claim 2, wherein the catalyst is used in an electrode of the solar cell.

4. The catalyst having a core-shell structure of claim 2, wherein the fuel cell is activated at room temperature directly as the platinum metal shell is 1-1.5 atomic layer.

* * * * *